United States Patent [19]
Semmler

[11] Patent Number: 5,923,155
[45] Date of Patent: Jul. 13, 1999

[54] CIRCUIT FOR THE PRODUCTION OF AN AUXILIARY VOLTAGE

[75] Inventor: Peter Semmler, Moosburg, Germany

[73] Assignee: Siemens Aktiengesellschaft, Munich, Germany

[21] Appl. No.: 08/981,740

[22] PCT Filed: Nov. 29, 1996

[86] PCT No.: PCT/DE96/02300

§ 371 Date: Dec. 23, 1997

§ 102(e) Date: Dec. 23, 1997

[87] PCT Pub. No.: WO97/24649

PCT Pub. Date: Jul. 10, 1997

[30] Foreign Application Priority Data

Dec. 28, 1995 [DE] Germany ............................ 195 48 986

[51] Int. Cl.$^6$ .................................................. G05F 1/40
[52] U.S. Cl. .......................................................... 323/266
[58] Field of Search ..................... 363/15, 16, 20, 363/21, 95, 97, 123; 323/266, 268, 273

[56] References Cited

U.S. PATENT DOCUMENTS

| 4,660,136 | 4/1987 | Montorefano | 363/26 |
| 5,122,945 | 6/1992 | Marawi | 363/21 |
| 5,455,501 | 10/1995 | Massie | 323/267 |
| 5,612,862 | 3/1997 | Marusik et al. | 363/93 |
| 5,701,238 | 12/1997 | Weidinger et al. | 363/21 |
| 5,703,765 | 12/1997 | Preis | 363/97 |

FOREIGN PATENT DOCUMENTS 7-135768  5/1995  Japan .

OTHER PUBLICATIONS

Patent Abstracts of Japan, vol. 095, No. 008—Sep. 29, 1995.

*Primary Examiner*—Matthew Nguyen
*Attorney, Agent, or Firm*—Hill & Simpson

[57] ABSTRACT

A circuit arrangement for auxiliary voltage production in which auxiliary voltage is produced essentially independently from a directly regulated output voltage of a transformer with the aid of a reverse voltage which is applied to an output rectifier.

4 Claims, 4 Drawing Sheets

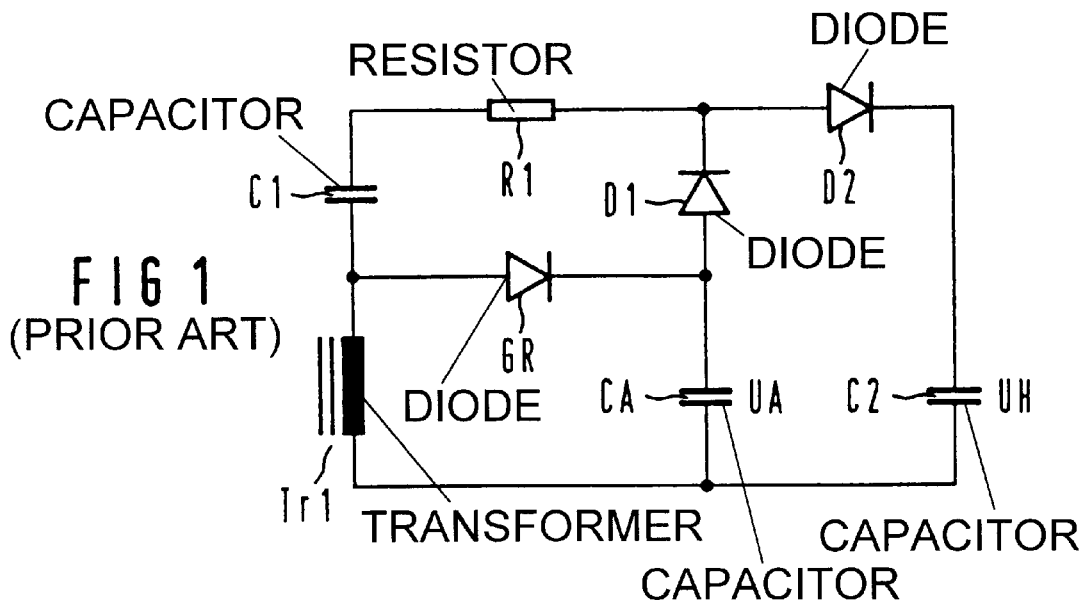
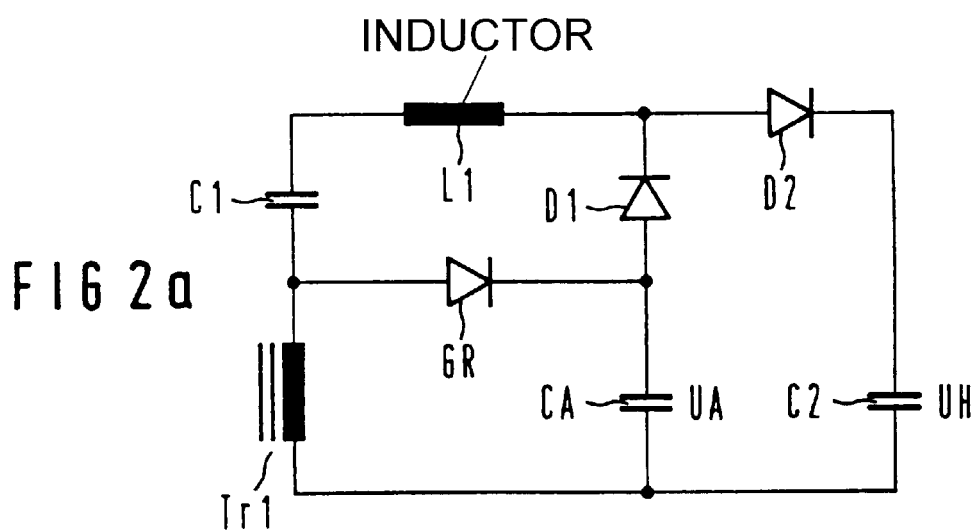
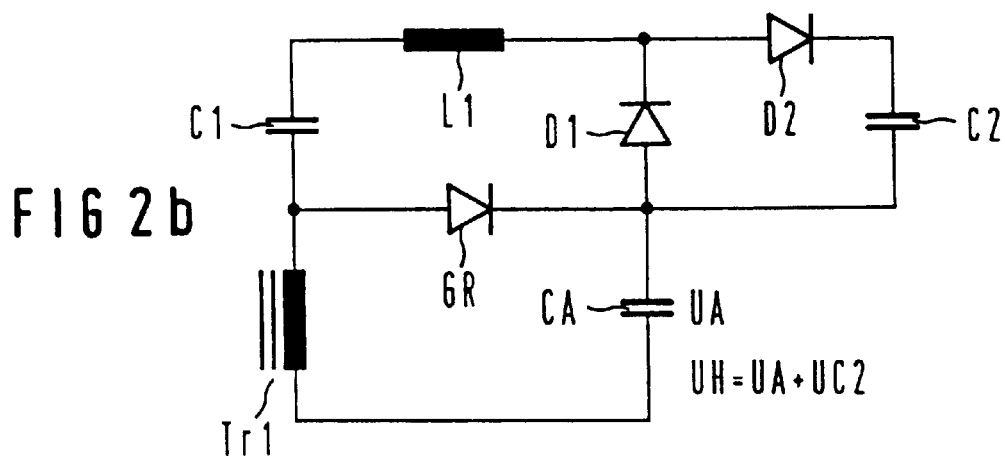

$UHn = UA + UC2 + UC2:2 + \ldots + UC2:n$ $UH = UA + UC2$ $UHn = UA + UC2 + UC2:2 + ... + UC2:n$

CIRCUIT FOR THE PRODUCTION OF AN AUXILIARY VOLTAGE

BACKGROUND OF THE INVENTION

1. Field of the Invention

The present invention relates to a circuit arrangement for auxiliary voltage production wherein an auxiliary voltage is produced essentially independently from a directly regulated output voltage of a transformer with the aid of a reverse-voltage which is applied to an output rectifier.

2. Description of the Prior Art

Additional auxiliary voltages are frequently required in the case of converters in order, to supply, for example an output voltage to a regulator, a monitoring circuit or a signalling unit. An essential requirement when supplying monitoring units or signalling units with an auxiliary voltage is that the auxiliary voltages should not be "hard"-coupled to the voltage of the directly regulated output circuit of the converter. If the additionally required auxiliary voltage is obtained, for example, from a further winding of either a transformer or an energy-storage inductor, it is coupled to that directly regulated circuit, that is to say that, for example, in the event of a short circuit in the directly regulated circuit, the auxiliary voltage breaks down and can no longer supply any output voltage. A reverse voltage, which is applied to AC output rectifier during a reverse phase, is used to avoid coupling the auxiliary voltage exclusively to the directly regulated output voltage.

The known circuit arrangement is illustrated in FIG. 1. The following circuit description relates to a condition when the circuit is in a steady state. The available reverse voltage $U_{SpDio}$ on the secondary rectifier diode GR during the reverse phase of the converter is rectified via a diode D1. Since the reverse voltage is present with low impedance on the secondary rectifier GR, a fast current riseis caused which is received by a buffer capacitor C1. In order that this current surge does not have a negative influence on, for example, any existing current mode regulation in the converter, and in order that the components used to produce the auxiliary voltage are not overloaded, this current surge is limited by a resistor R1 in series with is caused buffer or charging capacitor C1.

The capacitor C1 is now charged via this resistor R1 to the reverse voltage present on the secondary rectifier GR. If the converter is passing power to secondary side, then a voltage $U_A+U_d$ is present on the secondary winding Tr1. The potential $U_A$ is in this case, the output voltage of the converter and the potential $U_d$ is the forward voltage of the diode which is used. The voltage of the secondary winding is added to the voltage on C1. The capacitor C2, which is connected in parallel with the secondary winding Tr1 and the series circuit comprising C1, D2 and R1, is charged via the resistor R1 and the diode D2. The result of this at the capacitor C2 is:

$$U_H < U_{SpDio} - 2U_d + U_A.$$

In detail, the abbreviations are:

$U_H$: Auxiliary voltage,
$U_{SpDio}$: Reverse voltage on the secondary rectifier
$2U_d$: Forward voltage on the diodes D1, D2 and
$U_A$: Output voltage at the converter.

The voltage drop across the resistor R1 which, in some circumstances, is considerable, as well as the charging time constant of C1 and C2 have not been considered here.

A disadvantage in the case of this circuit arrangement is that the auxiliary voltage $U_H$ which is produced is, in practice, generally much smaller than the theoretically stated value. Other disadvantages of the circuit arrangement previously described and illustrated in FIG. 1 can be summarized as follows:

- in the case of converters having other input voltage ranges, the losses in the resistor R1 are very high,
- the circuit arrangement has a high internal impedance,
- in principle, the circuit has low efficiency,
- difficult design, particularly if the converter has a wide input voltage range or there is a large load range on the directly regulated output, and
- if the output voltages are small, the magnitude of the auxiliary voltage which is produced is frequently inadequate.

SUMMARY OF THE INVENTION

The object of the present invention is to refine a circuit arrangement for auxiliary voltage production in such a manner that the disadvantages mentioned above are avoided.

The invention has the advantage that the resistive losses are relatively small and the auxiliary voltage which is produced has no dependency on time as a result of an appropriate design, That is to say, the auxilliary voltage is independent of the duty cycle of the converter.

In an embodiment of the present invention, a circuit for auxiliary voltage production is provided which includes: a first series circuit formed of a first diode and a first capacitor connected at respective first and second ends; a transformer having a secondary winding connected in parallel to the first series circuit wherein a first end of the secondary winding is connected to a second end of the first diode and a second end of the secondary winding is connected to a second end of the first capacitor; a second diode having a first end connected to the first end of the first diode; a second series circuit formed of a third diode and a second capacitor connected at respective first ends, the second series circuit connected between the second end of the secondary winding of the transformer and a second end of the second diode; and a reactance circuit connected between the first end of the secondary winding of the transformer and the second end of the second diode.

In an embodiment, the reactance circuit includes a third series circuit formed of a third capacitor and a first inductor.

In an embodiment, the circuit further includes a fourth diode wherein a first end of the fourth diode is connected to a second end of the third diode; a third series circuit formed of a second inductor and a fourth capacitor, the third series circuit connected between the first end of the secondary winding of the transformer and a second end of the fourth diode; and a fourth series circuit formed of a fifth diode and a fifth capacitor, the fourth series circuit connected between the second end of the secondary winding of the transformer and the second end of the fourth diode.

In an embodiment, the fourth series circuit is connected in parallel with the fourth diode.

In an embodiment, the circuit further includes a third inductor connected between the first diode and the first capacitor, and a freewheeling diode connected between the second end of the first diode and the second end of the secondary winding of the transformer.

Additional features and advantages of the present invention are described in, and will be apparent from, the detailed description of the presently preferred embodiments and from the drawings.

DESCRIPTION OF THE DRAWINGS

FIG. 1 shows a prior art circuit.

FIGS. 2a and 2b show circuits for auxiliary voltage production in accordance with the principles of the present invention.

DETAILED DESCRIPTION OF THE PREFERRED EMBODIMENTS

Figure 3A:
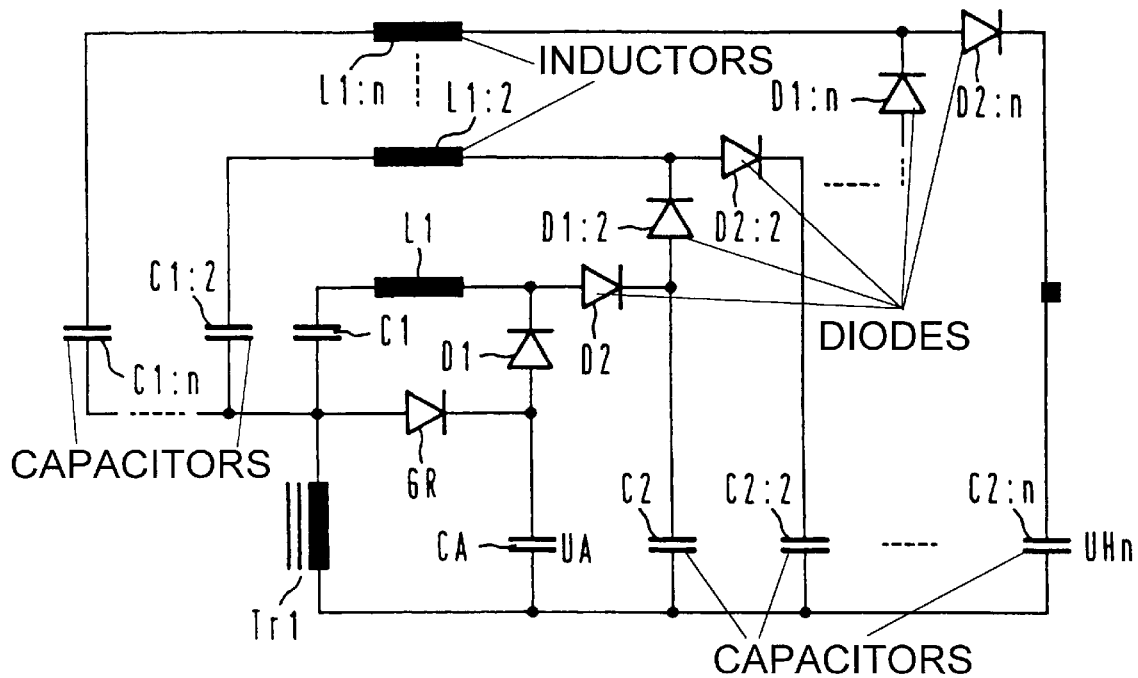
FIGS. 3a and 3b show alternative embodiments of auxiliary voltage production circuits for a fly back converter.

The circuit illustrated in FIG. 1 represents that which is known in the prior art and which has already been described in the Description of the Prior Art section of this application.

In the case of the circuit arrangement illustrated in FIG. 2a, an auxiliary voltage $U_H$ is produced with high efficiency and with a low output impedance by means of a resonant circuit which is easy to design. As in the case of the circuit arrangement described with reference to FIG. 1, the reverse voltage $U_{SpDio}$ on the secondary rectifier GR is made use of in this circuit arrangement. However, the reverse voltage $U_{SpDio}$ in the FIG. 2 circuit is not across the series circuit RC but across a series circuit comprising an inductor L1 and a capacitor C1. The natural frequency of the series circuit is designed such that the shortest possible duty ratio of the converter is greater than half the period duration of the series tuned circuit LC. This circuit definition according to the present invention achieves maximum charge on the capacitor C1 and thus also maximum charge on the capacitor C2. The diode D1 prevents the potential "swinging back".

The maximum charging current which occurs for the capacitor C1 can be set over a wide range as a result of the design of the inductor L1 and of the capacitor C1. Except for losses governed by technology in the diode D1, the capacitor C1 is charged to the potential $U_{SpDio}$ which is present on the reverse rectifier (secondary rectifier) GR. The capacitor C2 is charged by the potential present across the capacitor C1, via the inductance L2 and a further diode D2. Since this represents a further tuned circuit formed from the inductance L1 and a series circuit comprising the capacitances C1 and C2, this change in charge is also virtually loss free, except for the losses resulting from the diodes and the resistance in the inductor. Furthermore, the magnitude of the ripple and the rate at which the auxiliary voltage which is produced rises can be controlled by the size of the capacitor C2.

$$U_H = U_{SpDio} - 2U_d + U_A$$

$U_H$: Auxiliary voltage, $U_{SpDio}$ Reverse voltage across the secondary rectifier, $U_d$: Forward voltage across the diodes Di, D2 and $U_A$: Output voltage at the converter.

In contrast to the circuit described with reference to FIG. 1, the resistive losses in the inventive circuit are relatively small and the auxiliary voltage $U_H$ which is produced is not dependent on time. The auxiliary voltage $U_H$ which is produced is available with low impedance. The auxiliary voltage $U_H$ which is produced nearly reaches the theoretically stated level of the potential with the circuit arrangement shown in FIG. 2.

If the capacitance of the capacitor C2 is greater than the capacitance of the capacitor C1, only the ripple of the output voltage $U_H$ and the rate of rise of the auxiliary voltage $U_H$ which is produced are influenced, and not the resonant frequency of the auxiliary voltage production. The capacitor C2 is decoupled by the diode D2 during charging. The capacitors C1 and C2 which are used in the circuit arrangement produce an overall capacitance $C_{ges}$ (C1 in series with C2). If C2>>C1, then the overall capacitance $C_{ges}$ is approximately C1 and the resonant frequency during a change in charge is determined only by C1.

In the case of the circuit arrangement which is illustrated in FIG. 2b, the capacitor C2 is connected in series with the diode D2 and in parallel with the diode D1. The output voltage $U_H$ is composed of the voltage UA across the capacitor CA, across which the output voltage of the converter can be picked off, and of the potential $U_{C2}$ which is present across the capacitor C2.

$$U_H = U_A + U_{C2}$$

If the magnitude of the voltage produced is inadequate, then the circuit arrangement which is shown in FIG. 2a and FIG. 2b may be cascaded.

Figure 3B:
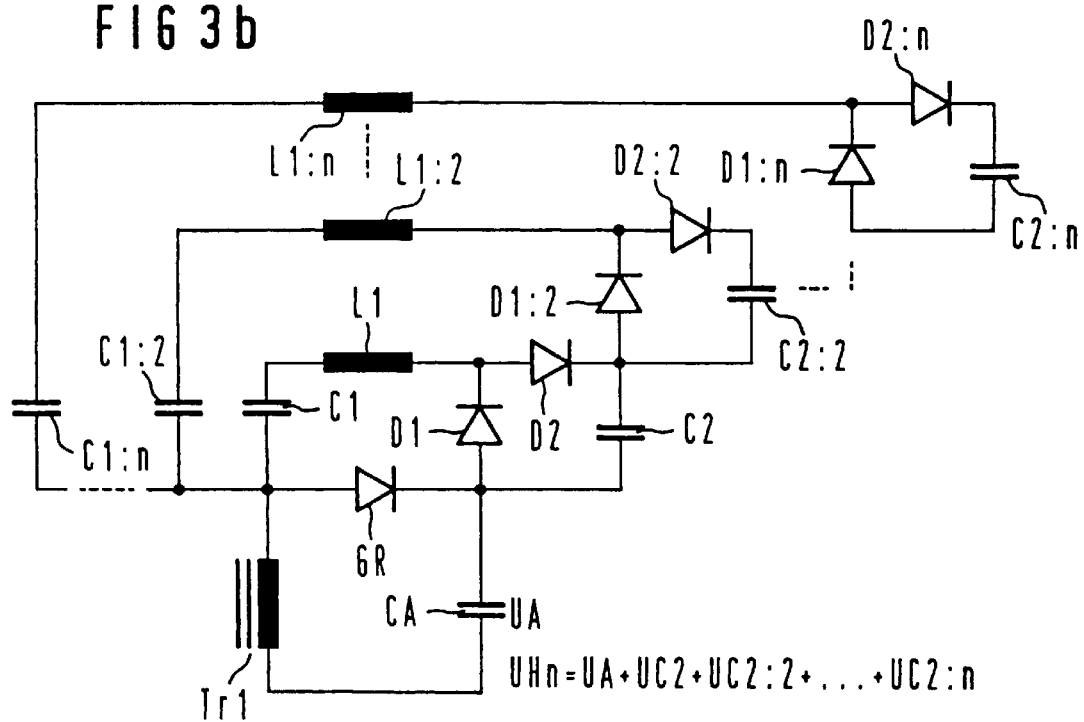

Cascading of the circuit arrangement which is illustrated in FIG. 2a is illustrated by way of example for a flyback converter in FIG. 3a and FIG. 3b. The circuit arrangement from FIG. 2a is developed in such a manner that a further diode $D_{1:2}$ is arranged with its anode connected to the cathode of the diode D2. Both a further series circuit, comprising $L_{1:2}$ and $C_{1:2}$, connected in parallel with the series tuned circuit L1, C1, and a further series circuit, comprising a diode $D_{2:2}$ and a capacitor $C_{2:2}$, are then connected to the cathode of the diode $D_{1:2}$. Further cascading can be achieved by arranging a series tuned circuit, formed from a capacitor $C_{1:n}$ and an inductor $L_{1:n}$, in parallel with the original tuned circuit $L_1$, $C_1$, and a further series circuit, comprising a diode $D_{2:n}$ and a capacitor $C_{2:n}$ in parallel at the cathode of the further diode $D_{1:2}$.

The auxiliary output voltage obtained is:

$$U_{Hn} = U_A + n(U_{SPDio} - 2U_d)$$

FIG. 3b illustrates cascading of the circuit arrangement illustrated in FIG. 2b. In the case of this circuit development, the anode of the diode $D_{1:2}$ is connected between the cathode of the diode D2 and the capacitor C2. A further series tuned circuit, comprising a capacitor $C_{1:n}$ and an inductance $L_{1:n}$, as well as a further series circuit, comprising the diode $D_{2:2}$ and a capacitor $C_{2:2}$, connected in parallel with the diode $D_{1:2}$, are now connected to the cathode of the diode $D_{1:2}$ in parallel with the series tuned circuit. This circuit extension can be repeated as frequently as desired, as illustrated in FIG. 3b.

The auxiliary output voltage in the case of a circuit arrangement according to FIG. 3b is given by:

$$U_{Hn} = U_A + U_{C2} + U_{C2:2} + \ldots + U_{C2:n}$$

Figure 4A:
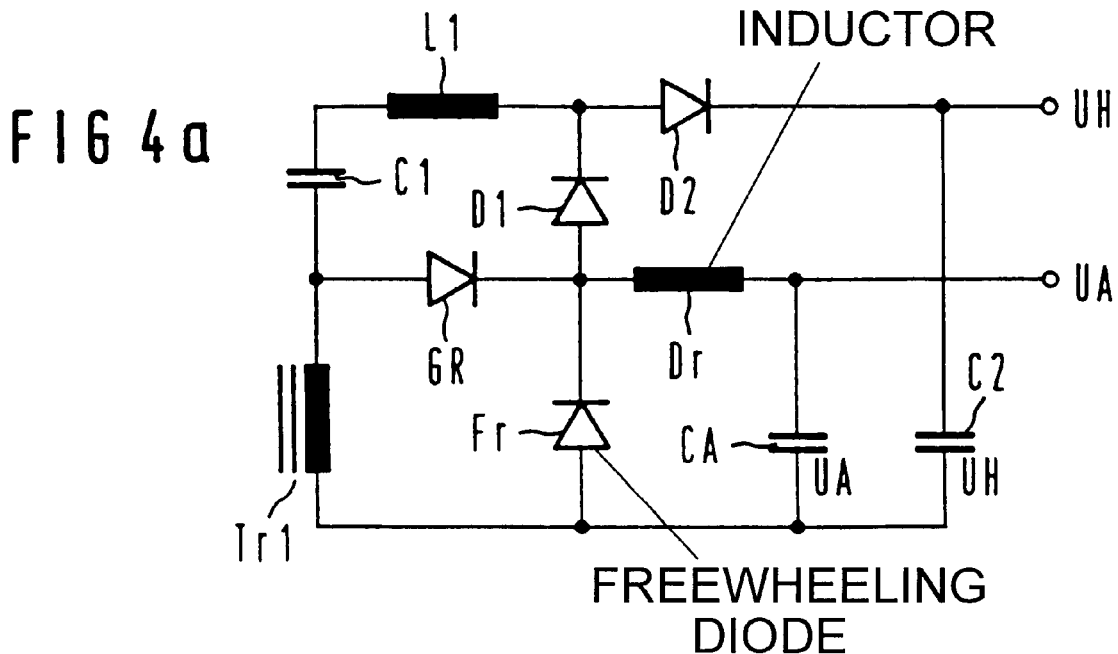
FIGS. 4a and 4b show alternative embodiments of auxiliary voltage production circuits for a forward converter.

A circuit arrangement for auxiliary voltage production which is preferred in the case of a forward converter is illustrated in FIG. 4a.

In order to prevent saturation of the transformer Tr1, any magnetic energy which is stored in the core during the current-flow phase must be extracted during the reverse phase. In general, this is achieved using sinusoidal demagnetization or by a demagnetizing winding. The potential occurring during demagnetization is also present across the secondary rectifier diode GR. This voltage is used by the circuit arrangement illustrated in FIGS. 4a, 4b. That is to say, the energy which is stored in the core of the transformer Tr1 is emitted to the secondary of the transformer.

Starting from the secondary of a transformer Tr1, the anode of a diode GR which carries the load current is arranged at the first connection of the transformer Tr1, and the cathode of a freewheeling diode Fr is arranged at the cathode of the diode GR. The anode of the free-wheeling diode is connected to the second connection of the transformer. A series circuit, comprising an inductor Dr and a capacitor CA, is arranged in parallel with the freewheeling diode Fr. On the one hand, a connection to the first connection of the transformer Tr1 is produced via a first series circuit, comprising L1, C1, to the diode D1 whose anode is connected to the cathode of the diode GR, which carries the load current, and the freewheeling diode Fr on the other hand, a connection to the second connection of the transformer is produced via a further series circuit, a diode D2 and a capacitor C2, to the diode D1 whose anode is connected to the cathode of the diode GR, which carries the load current, and the freewheeling diode Fr.

Figure 4B:
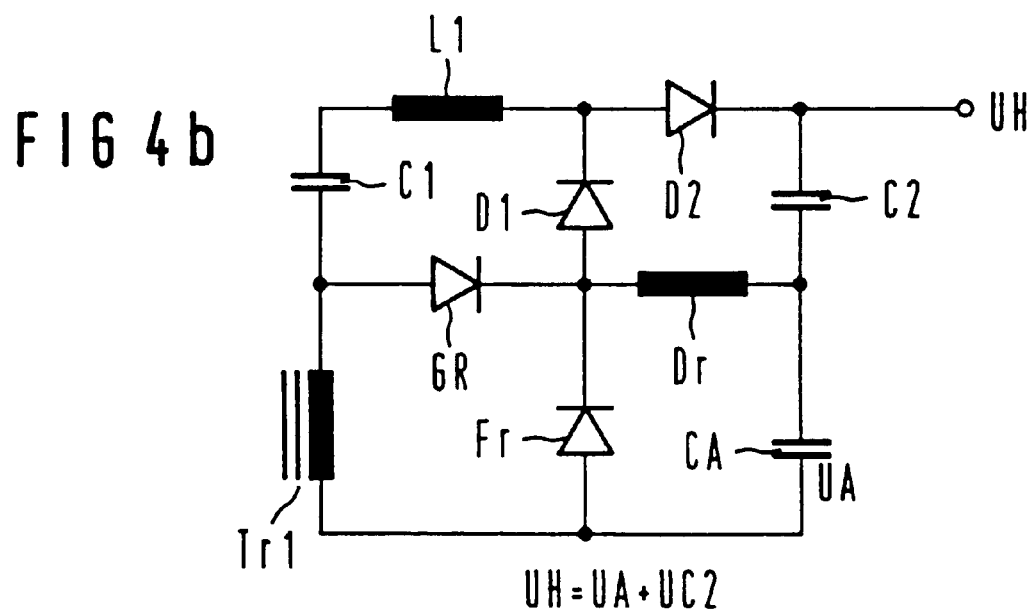

In the case of the circuit arrangement shown in FIG. 4b, a capacitor C2 is arranged in series with the capacitor CA. The series circuit comprising the inductor Dr and the capacitance CA is saved in comparison with the circuit arrangement shown in FIG. 4a. Instead of the series circuit, an inductor Dr is arranged between the cathode of the diode which carries the load current, and the capacitances C2 and CA.

The auxiliary voltage UH which results from the circuit arrangement is composed of the potential UA across the capacitance CA and the potential UC2 across the capacitance C2.

$$UH = UA + UC2$$

Cascading of the circuit arrangements illustrated in FIG. 4a and FIG. 4b results, for the circuit according to FIG. 4a, in an output voltage $$U_{Hn} = UA + n(U_{SPDio} - 2U_d)$$

and, for the circuit arrangement as in FIG. 4b, in an output voltage $$U_{Hn} = UA + UC2 + U_{C2:2} + \ldots + U_{C2:n}.$$

Figure 5A:
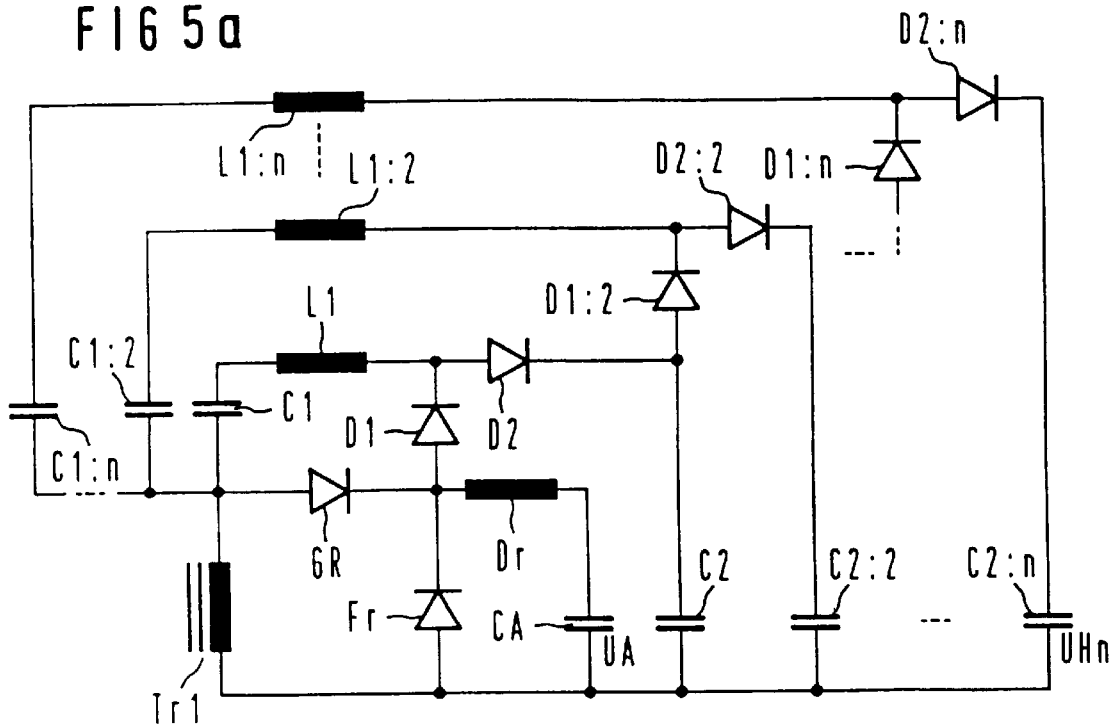
FIGS. 5a and 5b show additional alternative embodiments of auxiliary voltage production circuits in accordance with the principles of the present invention.
Figure 5B:
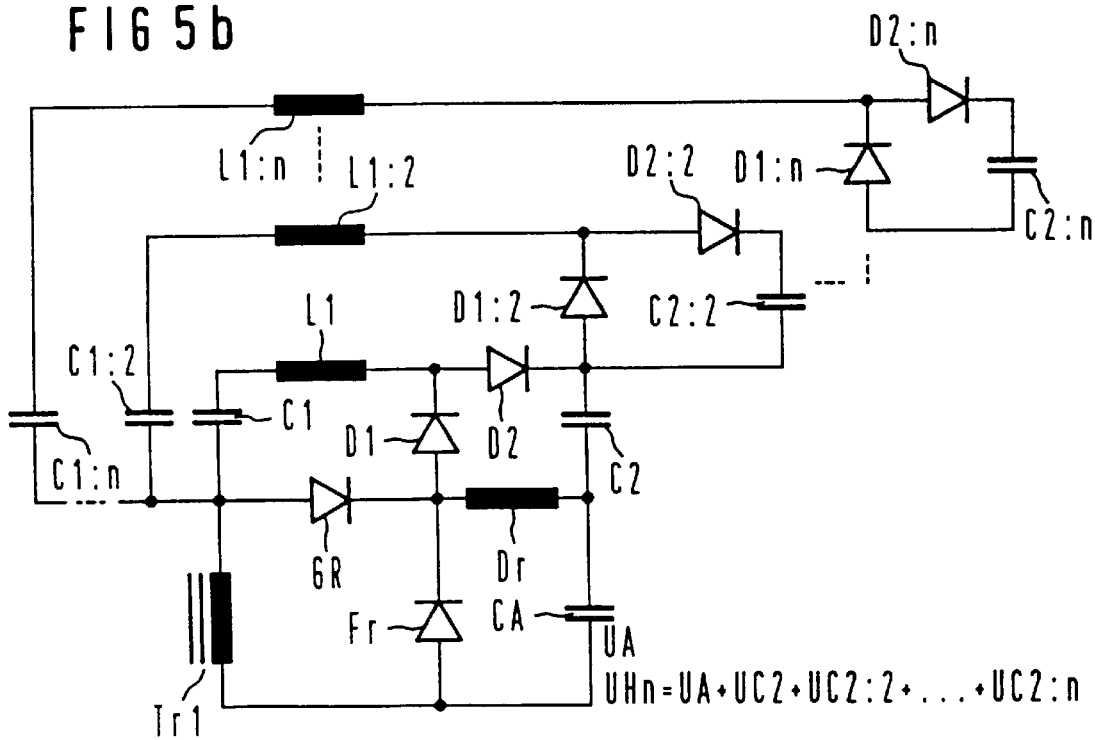

The corresponding circuit refinement is shown in both FIGS. 5a and 5b.

In practice, a resistor may have to be provided in parallel with the inductor L1 in all the circuit variants in order to damp the natural resonance.

The auxiliary voltage $U_H$ which is produced is dependent on the reverse voltage across the diode GR and thus on the input voltage to the converter. If it is intended to implement a regulated output voltage, then this can be stabilized by a downstream regulator.

Depending on the converter design, an additional inductor can be provided in series with D2 if the circuit is used in the forward converter. This applies in an analogous manner to the cascading of the circuit.

Although the present invention has been described with reference to specific embodiments, those of skill in the art will recognize that changes may be made thereto without departing from the spirit and scope of the invention as set forth in the hereafter appended claims.

I claim:

1. A circuit for auxiliary voltage production, comprising:
   a first series circuit formed of a first diode and a first capacitor connected at respective first ends;
   a secondary winding of a transformer connected in parallel to the first series circuit, wherein a first end of the secondary winding of the transformer is connected to a second end of the first diode and a second end of the secondary winding of the transformer is connected to a second end of the first capacitor;
   a second diode having a first end connected to the first end of the first diode;
   a second series circuit formed of a third diode and a second capacitor connected at respective first ends, the second series circuit connected between the second end of the secondary winding of the transformer and a second end of the second diode; and
   a third series circuit formed of a third capacitor and a first inductor, the third series circuit connected between the first end of the secondary winding of the transformer and the second end of the second diode.

2. A circuit for auxiliary voltage production as claimed in claim 1, further comprising:
   a fourth diode, a first end of the fourth diode connected to a second end of the third diode;
   a third series circuit formed of a second inductor and a fourth capacitor, the third series circuit connected between the first end of the secondary winding of the transformer and a second end of the fourth diode; and
   a fourth series circuit formed of a fifth diode and a fifth capacitor, the fourth series circuit connected between the second end of the second winding of the transformer and the second end of the fourth diode.

3. A circuit for auxiliary voltage production as claimed in claim 2, wherein the fourth series circuit is connected in parallel with the fourth diode.

4. A circuit for auxiliary voltage production as claimed in claim 1, further comprising:
   a third inductor connected between the first diode and the first capacitor; and
   a freewheeling diode connected between the second end of the first diode and the second end of the secondary winding of the transformer.

* * * * *